May 29, 1934. J. F. McKAY 1,960,590
PORTABLE TABLE FOR POWER HAND SAWS
Filed Feb. 25, 1933
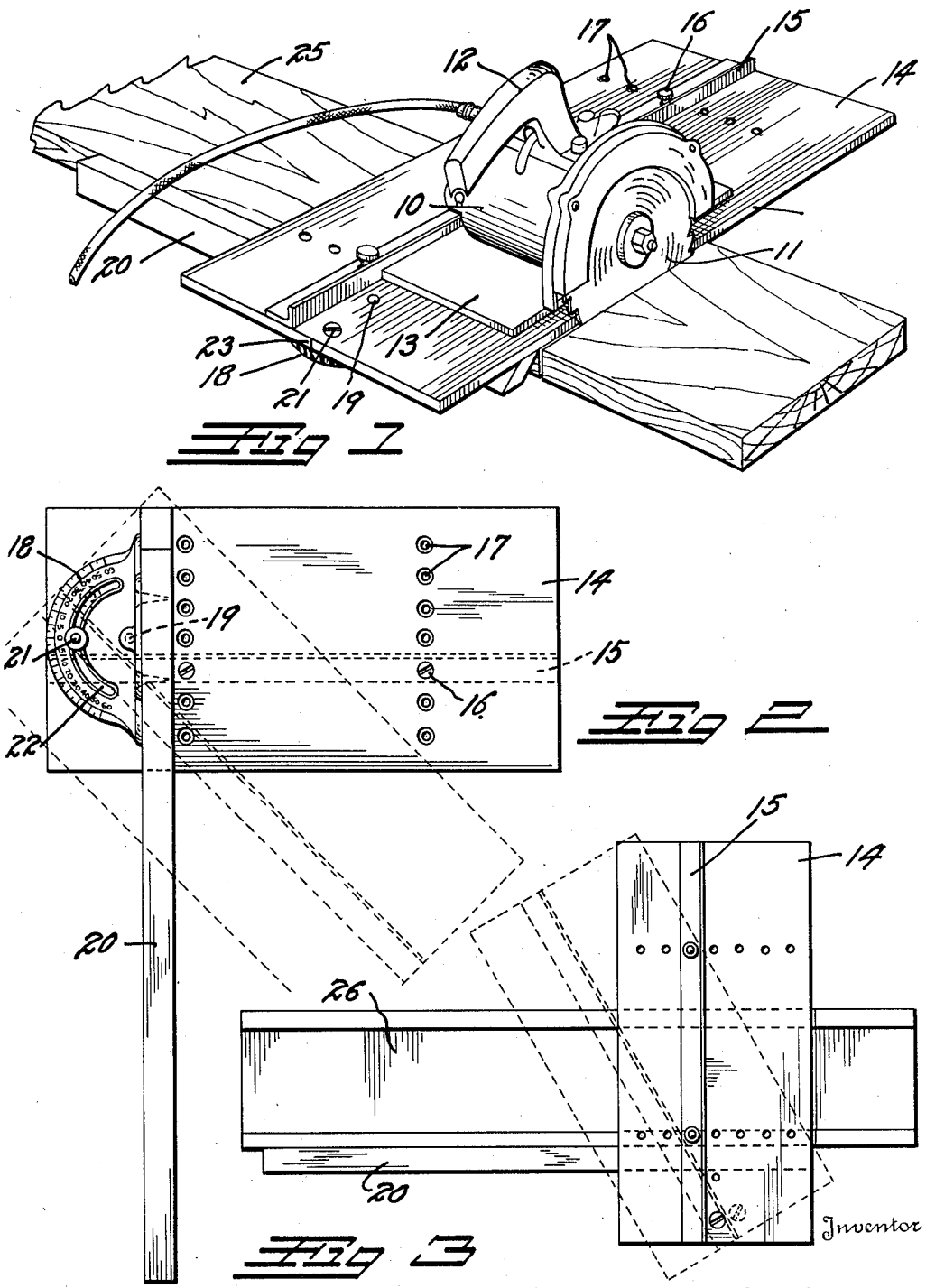
Jefferson F. McKay Patented May 29, 1934

1,960,590

UNITED STATES PATENT OFFICE 1,960,590

PORTABLE TABLE FOR POWER HAND SAWS

Jefferson F. McKay, Denver, Colo.

Application February 25, 1933, Serial No. 658,494

2 Claims. (Cl. 143—43)

There are many makes of power hand saws upon the market. These saws comprise a motor with a circular saw directly attached to the shaft thereof and a flat base member. They are designed to be pushed by hand across a board with the motor running so that the circular saw will quickly accomplish the work formerly done by means of a hand saw. It is extremely difficult, however, to direct the saw on an accurate line. Differences in the grain and hardness of the wood will deflect the saw to one side or the other, resulting in a rough cut, or an unnecessarily wide cut, or a crooked cut which will clamp and retard the saw.

Some users attempt to guide the saw by means of a tri-square or a straight edge. Such attempts are not always satisfactory, however, especially if the surface of the work or board is not truly flat. Any surface irregularities make it difficult to maintain the base against the straight edge and the pressure of the saw base against the straight edge makes it extremely difficult to maintain the straight edge in place. It is to overcome the above difficulties encountered with power hand saws that the present invention is designed.

The principal object of the present invention is to provide a light convenient, portable table for the saw which can be placed upon the board or other work to not only guide the saw but also to provide a flat, true surface for supporting the saw, so that a narrow accurate cut can be obtained with a minimum absorption of power.

Another object of the invention is to provide a guide which can be adjusted to direct the saw at any desired angle across the work and which will employ the weight of the saw structure to assist in holding the guide in place.

A further object of the invention is to provide a portable saw table which can be used upon a variety of different kinds of work; for instance, upon a single loose board or plank; upon a work bench, upon a miter box, etc.

A still further object of the invention is to provide a portable table for power hand saws which will be adjustable to receive saws of different sizes and makes and which will be adjustable to any desired angle of cut, and in which the angle of cut may be read directly from a protractor.

Other objects and advantages reside in the detail construction of the invention, which is designed for simplicity, economy, and efficiency. These will become more apparent from the following description.

In the following detailed description of the invention reference is had to the accompany drawing which forms a part hereof. Like numerals refer to like parts in all views of the drawing and throughout the description.

In the drawing:

Fig. 1 is a perspective view illustrating the improved portable table in use.

Fig. 2 is a bottom view of the table of Fig. 1.

Fig. 3 is a plan view of the table in use on a miter box.

A typical power hand saw is illustrated in Fig. 1 with its motor at 10, circular saw at 11; operator's handle at 12; and motor base at 13. The hand saw structure forms no part of the present invention, and is simply indicative of one of the many types of commercial power hand saws. These saws may vary in detail construction, but all are provided with the flat motor base 13 below which the circular saw 11 projects and it is with this base that the present invention cooperates.

The invention comprises: a flat, plane table 14 provided with a longitudinally-extending, adjustable guide fence 15, which may be secured in any desired lateral position on the table 14 by means of removable clamp screws 16. The clamp screws 16 may be placed in any of two similar series of guide holes 17 formed in the table 14.

On the bottom of the table 14, a protractor 18 is pivoted on a pivot pin 19. The protractor 18 is secured to and supports a squaring member 20. A clamp bolt and nut 21 pass through an arcuate slot 22 in the protractor so that the latter can be clamped in any desired position to project the squaring member 20 at any desired angle with relation to the guide fence 15. The protractor contains a suitable angle index by means of which the squaring member can be set at any pre-determined angle, there being an index mark 23 on the table to indicate on the protractor.

Differing types and makes of power hand saws have differing widths of base members 13. Any width can be accommodated, however, by adjusting the fence 15, in the holes 17, to bring the circular saw 11 closely adjacent to the forward edge 24 of the table 14.

The above described table can be used in many ways. For instance, let us assume that the operator desires to make a square cut from the extremity of a joist, such as indicated at 25 in Fig. 1. It is not necessary for him to transport the joist 25 to the saw or table. He simply places the table 14 on the joist wherever the latter may be, with his protractor set at the 0° indication, and presses the squaring member 20 firmly against the edge of the joist. He positions the front edge 24 of the table at the required cutting mark and pushes his saw along the table against the fence 15.

Since the table is sufficiently long to project beyond both edges of the joist, the saw will be solidly supported when it starts its cut and when it finishes the cut. The effect on the board being cut is similar to that of the usual stationary saw table on which the board is forced to cross the table against the saw. The present construction is an inversion of this, in which, the boards lie on the bottom of the table and the saw moves against the board.

It can be seen from the above that any desired angular cut can be made by simply setting the protractor at the desired degree. The fact that the board or joist may be warped or that the work may contain irregularities, moldings, etc. does not affect the accuracy of the saw for it always has a smooth top of the table 14 to travel along.

It it is desired to cut small moldings, strips, etc., a miter box such as indicated at 26 in Fig. 3 may be used. These miter boxes are usually built up by the carpenter or operator from scrap lumber on the job. The table 14 is laid across the miter box with the squaring member 20 against the side thereof. The table is set to any desired angle and the saw pushed across, so as to cut a slot through the miter box. The work can then be laid in the box and cut to the desired angle by simply pushing the saw back and forth across the box. Many other adaptations of the invention will become apparent to the skilled mechanic, all of which may be accomplished with perfect facility and accuracy because of the portable table 14, and its aligning or squaring member 20.

It is relatively easy to maintain the table in its required position on the board or work. First, because of the broad bottom surface which is in contact with the work; and second, because the weight of the saw structure itself firmly presses this broad contact surface into frictional engagement with the work so that there is no liability of the table shifting its position during the sawing operation.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A portable guide member for power hand saws comprising: a flat plane table member adapted to be laid across the work; a squaring member projecting downwardly from and laterally across said table member to engage an edge of the work; and a guide member extending longitudinally of said table so as to guide a power saw longitudinally of said table and across said work at an angle predetermined by the position of said squaring member; and means for setting said guide member at any desired lateral position on said table member.

2. A portable guide member for power hand saws comprising: a flat plane table member adapted to be laid across the work, said table member being provided with two spaced apart, laterally extending, series of holes; a squaring member projecting downwardly from and laterally across said table member to engage an edge of the work; a guide member; and means for securing said guide member to the top of said table through any desired holes in said series.

JEFFERSON F. McKAY.